US007308501B2

(12) United States Patent
DeLima et al.

(10) Patent No.: US 7,308,501 B2
(45) Date of Patent: Dec. 11, 2007

(54) METHOD AND APPARATUS FOR POLICY-BASED PACKET CLASSIFICATION USING HASHING ALGORITHM

(75) Inventors: Roberto DeLima, Apex, NC (US); Lap T. Huynh, Apex, NC (US); Dinakaran B. Joseph, Durham, NC (US); John J. Majikes, Apex, NC (US); Robert E. Moore, Durham, NC (US); Lee M. Rafalow, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 09/904,025

(22) Filed: Jul. 12, 2001

(65) Prior Publication Data

US 2003/0014525 A1    Jan. 16, 2003

(51) Int. Cl.
*G06F 15/16* (2006.01)
*H04L 9/00* (2006.01)

(52) U.S. Cl. ............. 709/227; 713/179; 713/181; 370/395.25

(58) Field of Classification Search ........ 709/200–203, 709/217, 238, 245, 229, 246, 236, 227; 380/277–279; 370/230, 235, 395.32; 713/202, 1.55, 155, 713/201, 151; 710/20, 52; 707/7
See application file for complete search history.

(56) References Cited

U.S. PATENT DOCUMENTS 4,823,345 A    4/1989 Daniel et al. .............. 371/37
5,973,696 A  * 10/1999 Agranat et al. ............ 715/760
6,185,598 B1 *  2/2001 Farber et al. .............. 709/200
6,223,222 B1 *  4/2001 Fijolek et al. ............. 709/227
6,374,300 B2 *  4/2002 Masters .................... 709/229
6,389,419 B1 *  5/2002 Wong et al. ................. 707/7
6,421,730 B1 *  7/2002 Narad et al. .............. 709/236
6,499,110 B1 * 12/2002 Moses et al. ................ 726/1
6,665,725 B1 * 12/2003 Dietz et al. ................ 709/230
6,788,647 B1 *  9/2004 Mohaban et al. .......... 370/235
6,834,112 B1 * 12/2004 Brickell .................... 380/279
6,857,067 B2 *  2/2005 Edelman .................... 713/155
6,925,085 B1 *  8/2005 Krishna et al. ........ 370/395.32

* cited by examiner

*Primary Examiner*—David Wiley
*Assistant Examiner*—Jude J Jean-Gilles
(74) *Attorney, Agent, or Firm*—Duke W. Yee; Jerry W. Herndon; Gerald H. Glanzman

(57) ABSTRACT

A method, apparatus, and computer implemented instructions for processing a request in a data processing system. The request is received. In response to a first hash value being present within the request, the first hash value is compared to a second hash value that was computed locally, wherein the second hash value represents a current policy configuration for assigning a quality of service. In response to a match between the first hash value and the second hash value, other information in the request is used to establish a quality of service for packets associated with the request.

15 Claims, 3 Drawing Sheets

METHOD AND APPARATUS FOR POLICY-BASED PACKET CLASSIFICATION USING HASHING ALGORITHM

FIELD OF THE INVENTION

The present invention relates generally to an improved data processing system and in particular to a method and apparatus for processing data. Still more particularly, the present invention provides a method, apparatus, and computer implemented instructions for classifying packets.

BACKGROUND OF THE INVENTION

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user=s Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

In transferring and processing requests for data, such as Web pages, packets containing requests and data are sent over the Internet through one or more routes between the source and the destination. The transfer of these packets are part of HTTP transactions. In some cases, certain packets may be given priority over other packets. The ability to define a level of performance is called a quality of service (QoS). For example, many networks specify modes of service that ensure optimum performance for traffic such as real-time voice and video. QoS has become a major issue on the Internet as well as in enterprise networks, because voice and video are increasingly traveling over IP-based data networks that were not designed for continuous speech or viewing.

The priority of a packet is identified using a classification. A packet received by a server or router is classified to identify a QoS. A field may be set in a header of a packet to identify the classification of the packet. The classification of the packet is determined by comparing the packet to a policy rule within a policy, which is a set of rules used to handle packets. Characteristics, such as sender address, recipient address, data type, and user identification may be used as inputs into a policy rule. Currently, each packet is analyzed to identify a classification. This type of processing increases the time needed to route a packet to a destination.

Therefore, it would be advantageous to have an improved method, apparatus, and computer implemented instructions for classifying packets.

SUMMARY OF THE INVENTION

The present invention provides for a method, apparatus, and computer implemented instructions for processing a request in a data processing system. The request is received. In response to a first hash value being present within the request, the first hash value is compared to a second hash value that was computed locally, wherein the second hash value represents a current policy for a quality of service. In response to a match between the first hash value and the second hash value, other information in the request is used to establish a quality of service for packets associated with the request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
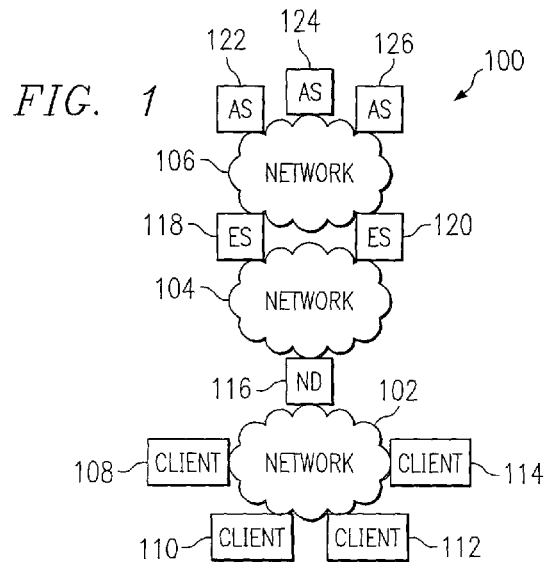
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains networks 102, 104, and 106. These networks are the medium used to provide communications links between various devices and computers connected together within network data processing system 100. Network 102 may include connections, such as wire, wireless communication links, or fiber optic cables. In this example, network 102 is the Internet while network 104 is a wide area network (WAN) encompassing a geographic area, such as a city or a university campus. Network 106 is a local area network (LAN) in this example. Clients 108, 110, 112, and 114 are connected to network 102 and may generate HTTP requests. Network dispatcher (ND) 116 receives requests from clients 108, 110, 112, and 114 through network 102. Network dispatcher 116 is used to route requests to servers, such as edge servers (ESs) 118 and 120, through network 104. These edge servers perform packet processing, in these examples, to apply policies in identifying a quality of service to be associated with packets in an HTTP transaction. Network dispatcher 116 routes requests to a particular edge server based on load balancing criteria and criteria relating to the nature of the request. Each time a request is received, regardless of whether the request is the first request for a new HTTP transaction, or a subsequent request for an existing HTTP transaction, network dispatcher 116 makes a new selection of an edge server based on load balancing criteria and criteria related to the nature of the request. An edge server is a device that provides front-end processing for HTTP requests. When possible, the edge server processes a request without involving the back-end application server.

Edge servers 118 and 112 send requests to an appropriate application server, such as application servers (ASs) 122, 124, or 126 through network 106. The particular application server selected depends on the suitability of the application server to process a request. In this example, applications servers 122, 124, and 126 form a Web server with edge servers 118 and 120 providing a front for the Web server.

The present invention provides a method, apparatus, and computer implemented instructions for classifying packets for HTTP requests using one or more policy rules. The mechanism of the present invention recognizes that packet classification policies change relatively infrequently. Ordinarily, a particular policy will apply to all edge servers fronting a single Web server. A policy is a set of rules, also referred to as policy rules, used to handle packets. In these examples, a particular HTTP request is handled using an individual policy rule. The present invention also recognizes that the process of classifying a packet is expensive from a performance point of view. Thus, the mechanism of the present invention optimally performs a full classification for an HTTP client only once, when the first HTTP request is received from the client. The intermediate results are stored in a data structure (a cookie), which is placed in the HTTP headers of the HTTP requests and replies involving that client. In this example, the data structure takes the form of a cookie. For subsequent HTTP requests, classification is performed from the data in the cookie.

The intermediate results from this classification are placed into four additional tables based on information extracted using the policy rules in these examples. These tables provide 32-bit integer indexes for all the Users, UserGroups, ServerDomains (i.e., hostnames like www.ibm.com), and URI prefixes mentioned in any of the policy rules. This intermediate information is used later for the partial classification (P) process. The basic idea is that if any policy rule mentions User="James Smith", an entry will be built in this table that associates "James Smith" with the index 6. Then, the 6, not the string "James Smith", is stored in the QoS cookie, and that is used in the partial classification (P) process. In fact, this information is used in the full classification process as well because it is less costly to perform string comparisons once in the User table to locate the index for "James Smith", and then do integer comparisons when examining all of the policy rules that refer to users. User Groups are handled in the same manner.

In this manner, a full classification is unnecessary unless the policies under which the original classification change or unless different edge servers have different policies. In this case, the edge server does not use the data in the cookie, but performs a full packet classification based on the current policy.

An edge server, such as edge server 118, will send a packet to an application server, such as application server 122. A reply will be returned from application server 122 to edge server 118. This reply will contain the cookie created by the edge server. This cookie will then be returned to the client. The client, in turn, will include the cookie in the client=s next HTTP request, which is how the information from the previous classification is made available to whichever edge server is selected to process that next request.

Figure 2:
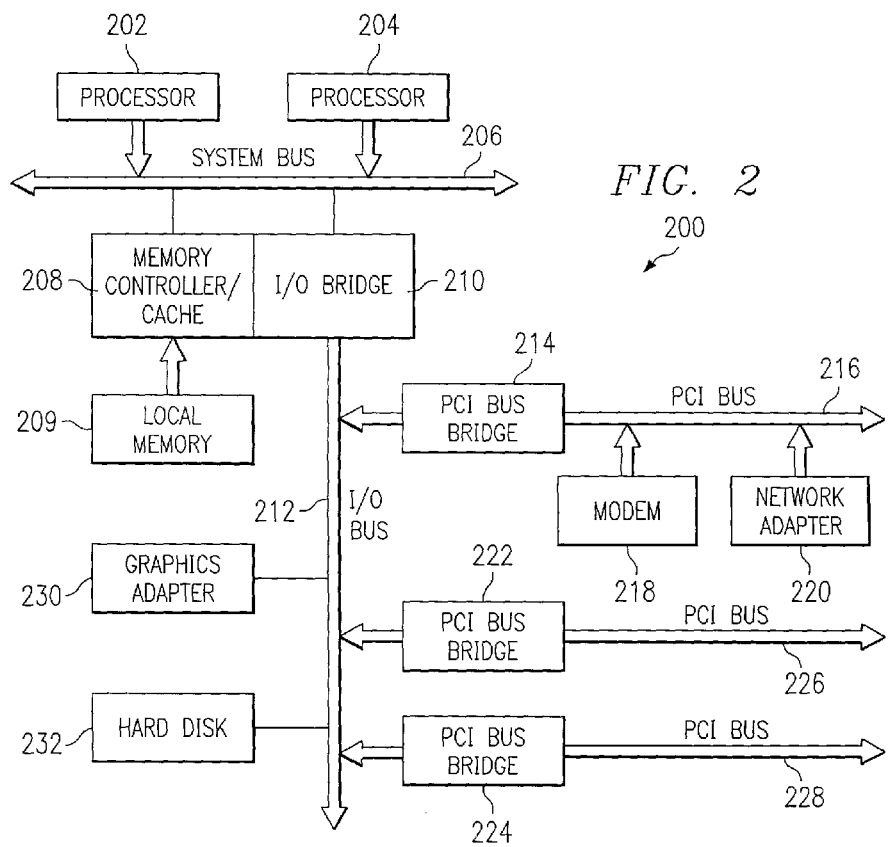
FIG. 2 is a block diagram of a data processing system that may be implemented as a server in accordance with a preferred embodiment of the present invention.

Network data processing system 100 may include additional servers, clients, and other devices not shown. FIG. 1 is intended as an example, and not as an architectural limitation for the present invention. Referring now to FIG. 2, a block diagram of a data processing system that may be implemented as a server, such as an application server or an edge server as shown in FIG. 1, is depicted in accordance with a preferred embodiment of the present invention. Additionally, this data processing system also may be used to perform network dispatching functions, such as those performed by network dispatcher 116 in FIG. 1.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-114 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
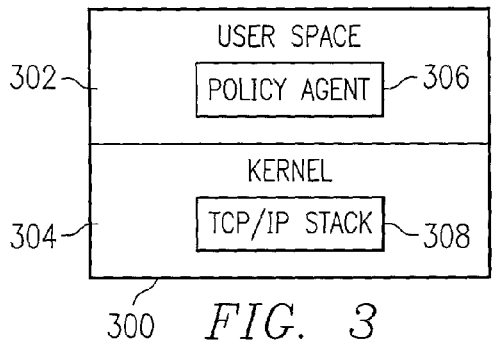
FIG. 3 is a block diagram illustrating a data processing system in which the present invention may be implemented.

With reference now to FIG. 3, a diagram of components in an edge server is depicted in accordance with a preferred embodiment of the present invention. These components may be implemented in an edge server, such as edge server 118 or 120 in FIG. 1. Edge server 300 includes user space 302 and kernel 304. Policy agent 306 in user space 302 performs packet processing in these examples. Policy agent 306 applies policies to packets in determining the quality of service (QoS) to be applied to packets in an HTTP transaction. Policy agent 306 will perform a full classification for the first request from a particular HTTP client, and store the results in data structures, such as cookies, which are placed within the subsequent HTTP requests and replies involving that client.

The policy, which includes the policy rules applied in classifying packets, is flattened or placed into the form of an input string. In these examples, this input string is processed using a hash algorithm with the resulting hash value being stored in a cookie containing the intermediate results of the classification. Intermediate results or data are the index values like the 6, that identify the user "John Smith". This data is intermediate in the sense that it lets the policy agent start at a point part-way through the classification process, rather than finding the user=s identity from the request and walking through the user table (with expensive string comparisons) to find out which index value the user corresponds to. The policy agent is given this index value in the QoS cookie and the policy agent starts the classification process from that point. Of course, in the case where everything including the URI substring matches, the index that the agent uses is the one for the QoS action.

In this case, the policy agent starts at the end of the entire classification process. A hash algorithm is an algorithm that turns a variable-sized amount of text into a fixed-sized output, which is referred to as a hash value. Any appropriate hashing algorithm may be used in which a fixed-length value is generated from a variable-length policy. Since the hash algorithm is executed infrequently, only when policy changes, performance of this algorithm is not of overriding importance. The policy changes even if a single policy rule is altered, added, or deleted from the policy. Thus, an algorithm, such as MD5=s 128-bit checksum, which has an extremely low probability of collisions, is the preferred choice in the depicted examples. Before the results in the cookie are used, policy agent 3406 will determine whether a hash value for the current policy being implemented matches the one in the cookie. If a match is present, then the results in the cookie are used. Otherwise, a full classification is performed.

The results of the classification, regardless of whether a full classification is performed or if the results from the cookie are used, are sent to TCP/IP stack 308 in the form of ancillary data. Ancillary data is different. It is the specific QoS treatment instructions that are passed down to the TCP/IP stack. It is the result of the classification process, not a part of it. In particular, when edge server 300 prepares to forward the IP packet containing the HTTP reply back to the network dispatcher that sent it the request, TCP/IP stack 308 in kernel 304 consults the ancillary data that policy agent 306 passed to TCP/IP stack 308 back when policy agent 306 processed the request. Based on this ancillary data, TCP/IP stack 308 sets the differentiated services code point (DSCP) in the IP packet header, so that subsequent devices in the path to the client can, if they are so configured, give the proper QoS treatment to the packet. The stack also provides some QoS functions for the packet itself, related to queuing and to the management of the TCP connection that the packet flows on. Note that this ancillary data is available for TCP/IP stack 308 to use in processing each IP packet that goes to make up an HTTP reply, even if the IP packet does not contain the HTTP header and hence does not contain the cookie.

Figure 4:
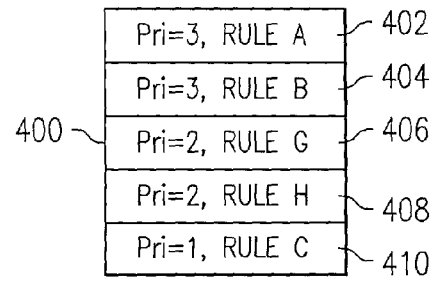
FIG. 4 is a diagram of components in an edge server in accordance with a preferred embodiment of the present invention.

Turning next to FIG. 4, a diagram of rules forming a policy is depicted in accordance with a preferred embodiment of the present invention. Policy configuration 400 in this example is an example of a policy that may be implemented in a server, such as an edge server to classify a packet in determining a QoS to use in transporting the packet. In this example, policy configuration 400 includes rules 402, 404, 406, 408, and 410. Policy configuration 400 is a complete policy passed to a hash algorithm as an input string in these examples. A particular QoS treatment for an HTTP request is determined using an individual policy rule, such as rule 404.

In a preferred embodiment, policy configuration 400 is received from a lightweight directory access protocol (LDAP) directory. LDAP is protocol used to access a directory listing. Attributes representing policy in an entry, such as a rule, may come from this type of directory in an unpredictable order. When the entries are placed into an order, such as that shown in FIG. 4, the data structure may be used to construct input strings for use with hash algorithms. Policy configuration 400 forms the input string that is used by the hash algorithm. This data structure is the input string, which is in the form of a octet string or a sequence of bytes, rather than a character string. The first byte of the structure is passed to the hash algorithm and subsequent bytes are passed sequentially until the last byte has been sent to the algorithm.

Figure 5:
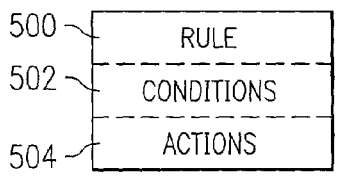
FIG. 5 is a diagram of rules forming a policy in accordance with a preferred embodiment of the present invention.

With reference now to FIG. 5, a diagram of a rule is depicted in accordance with a preferred embodiment of the present invention. Rule 500 includes conditions 502 and actions 504. When conditions 502 for a policy rule evaluate to True, then all of the actions for that rule are performed, in the order in which they appear in actions 504.

Figure 6:
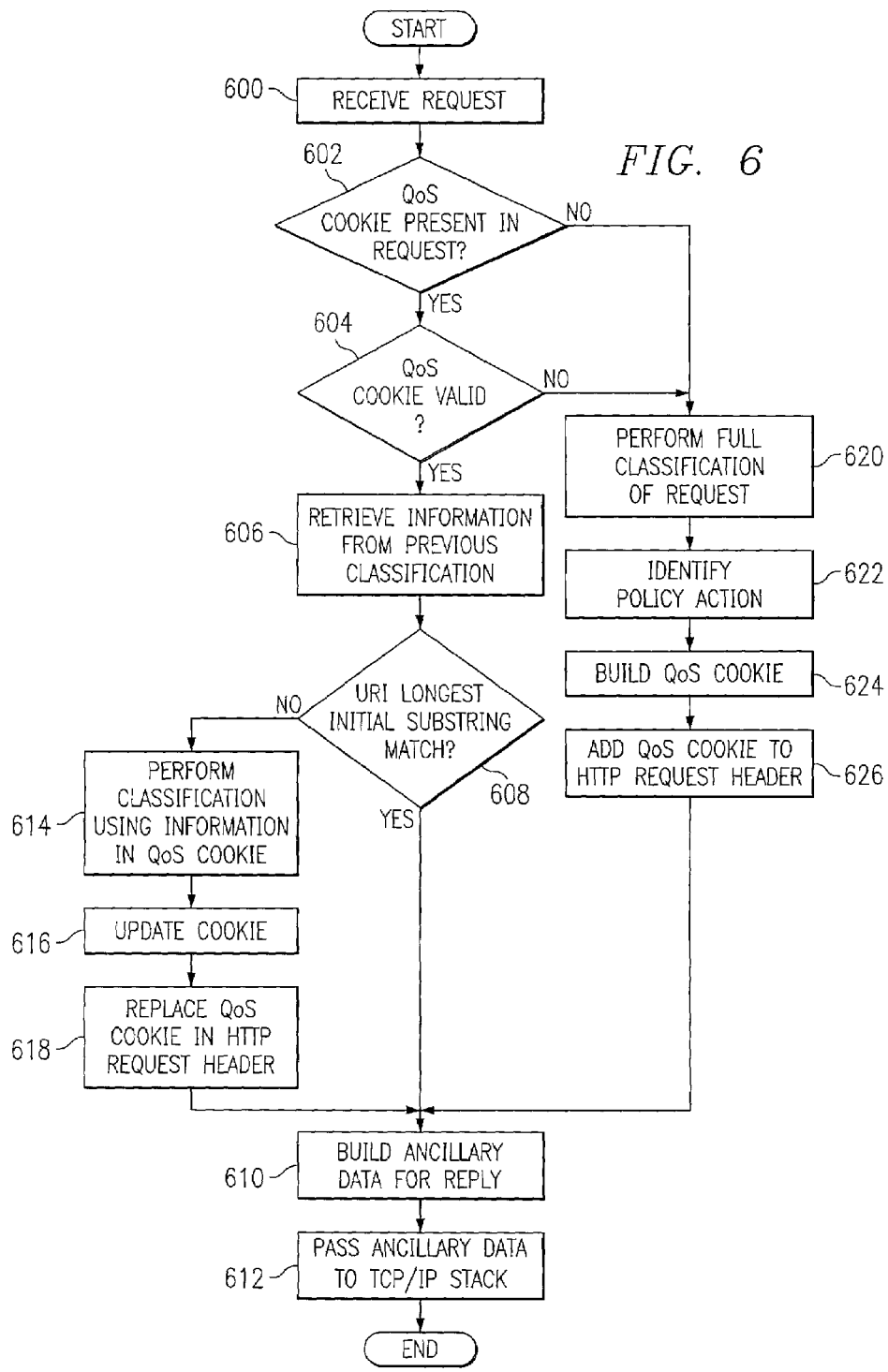
FIG. 6 is a diagram of a rule in accordance with a preferred embodiment of the present invention.

Turning next to FIG. 6, a flowchart of a process used for processing packets is depicted in accordance with a preferred embodiment of the present invention.

The process illustrated in FIG. 6 may be implemented in a policy agent, such as policy agent 306 in FIG. 3.

The process begins by receiving a request from a requester (step 600). This request is in the form of a packet containing a request. The request may originate from a client, but in the example configuration shown in FIG. 1, it is received from a network dispatcher. A determination is made as to whether a quality of service (QoS) cookie is present in the request (step 602). A QoS cookie is a cookie containing results from a prior classification as well as a hash value used to identify a complete policy configuration for an edge server. If a QoS cookie is present, a determination is then made as to whether the QoS cookie is valid (step 604). In some cases, the QoS cookie may be invalid because the edge server=s policy configuration has been updated since the cookie was created. In other cases, the configuration may be invalid because the edge server processing the current HTTP never had the same policy configuration as the one that processed the request for which the QoS cookie was created. If the QoS cookie is valid, information from a previous classification is retrieved from the QoS cookie (step 606). Next, a determination is made as to whether the universal resource identifier (URI) in the HTTP header of the current request maps to the same longest initial substring as did the URI from the request for which the QoS cookie was created (step 608). A URI is the right-hand part of a universal resource locator after the host name. An index for the substring to which the URI from this previous request mapped is one of the pieces of information stored in the QoS cookie. If the answer to this determination is yes, ancillary data is built, with instructions to the TCP/IP stack describing the QoS treatment that the stack should give to the IP packets forming the HTTP reply or replies to this HTTP request (step 610). This ancillary data includes instructions for marking the DSCP in the packet headers to influence the QoS treatment they will receive from downstream devices, as well as rate and token-bucket parameters to modify the QoS treatment the packets will receive on the egress path out of the edge server itself. The ancillary data is then passed to a TCP/IP stack (step 612) with the process terminating thereafter.

Turning back to step 608, if the URI in the request does not map to the same longest initial substring as the one from the request for which the QoS cookie was created, a classification is performed using information in the QoS cookie (step 614). This classification is performed using existing information in the cookie, such as the enumerated user and the enumerated user QoS group id along with the URI from the header of the packet. The cookie is updated with an index to the new URI longest substring and the new classification results (step 616). The QoS cookie in the HTTP request header is replaced with the updated cookie (step 618), and the process proceeds to step 610 as described above. Ancillary data is built and passed to the TCP/IP stack.

With reference again to step 604, if the QoS cookie is not up to date, a full classification of the request is performed (step 620), and a policy action is identified (step 622). The full classification includes enumerating the user names, user QoS group, and URI based on the current policy. Additionally, a classification algorithm is invoked using these numerated numbers. Once the classification is performed and a policy action has been identified, a QoS cookie is built containing these classification inputs and results (step 624). Next, the QoS cookie is added to the HTTP request header (step 626). The process then proceeds to step 610 as described above. Turning back to step 602, if a QoS cookie is not present, the process proceeds to step 620 as described above.

Figure 7:
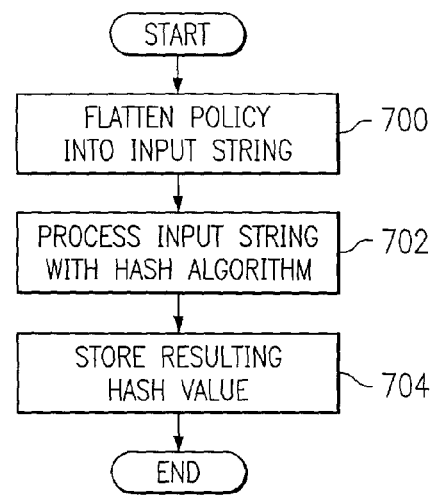
FIG. 7 is a flowchart of a process used for processing packets in accordance with a preferred embodiment of the present invention.

Turning next to FIG. 7, a flowchart of a process used for generating a hash value representing a complete policy configuration is depicted in accordance with a preferred embodiment of the present invention. The process illustrated in FIG. 7 may be implemented in a policy agent, such as policy agent 306 in FIG. 3.

The process begins by flattening a complete policy configuration into an input string (step 700). Next, the input string is processed with a hash algorithm (step 702). Then, the resulting hash value is stored (step 704) with the process terminating thereafter.

In some cases, a reply returned to the policy agent also may contain another cookie, providing information from the application running at the application server, that will cause the edge server to re-perform its QoS calculation for that reply. This additional cookie also is referred to as an application cookie. The two cookies are related, in that if the edge server recalculates the QoS based on the application cookie, it includes the application name and priority from the application cookie in the new QoS Cookie that it generates. This process is performed so that the policy agent will not have to recalculate the QoS the next time that the application sends the policy agent this application cookie.

Thus, the present invention provides an improved method, apparatus, and computer implemented instructions for classifying packets based on a policy. In these examples, an individual policy rule within the policy is applied to a particular HTTP request. The mechanism of the present invention allows for a full classification of a request from an HTTP client to be performed only once. A hash value is generated for the policy configuration that was used to classify the packet. The hash value as well as the results of the classification are placed in the packet. When a subsequent packet is received containing a hash value, this hash value is compared to another hash value for the policy configuration currently in effect. If a match is present between the hash values, the packet is classified using the results from the previous classification, to avoid performing a full classification for each packet. By reducing the number of times a classification is performed, the performance in processing packets is improved.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. For example, the mechanism of the present invention is not limited for use with HTTP requests, but may be applied for other types of transport protocols in which a quality of service is identified. Additionally, the hash values may be placed in other types of data structures in a request other than a cookie. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing a request, the method comprising:
receiving the request;
responsive to a first hash value being present within the request, comparing the first hash value to a second hash value, wherein the second hash value represents a current policy configuration for a quality of service;

responsive to a match between the first hash value and the second hash value, setting a quality of service based on information associated with the first hash value;

responsive to an absence of a hash value in the request, identifying a policy rule for processing the request to form an identified policy rule;

identifying a classification for the request using the identified policy rule; hashing the current policy configuration, of which the identified policy rule is a part, using a hashing algorithm to generate a current hash value; and placing the current hash value and the information into the request.

2. The method of claim 1, wherein the hash value and information are placed into a cookie.

3. A method in a data processing system for processing a request, the method comprising:

responsive to receiving a request containing a selected cookie in which the selected cookie includes a first hash value and information associated with the hash value, determining whether the first hash value corresponds to a second hash value, wherein the second hash value represents a current policy configuration for processing reguests by the data processing system;

responsive to a correspondence between the first hash value and the second hash value, processing the request using the information;

responsive to receiving a request containing the selected cookie, determining whether the selected cookie is stale;

responsive to a determination that the selected cookie is not stale, generating a new classification; and responsive to a determination that the selected cookie is stale, preventing initiation of the step of determining whether the first hash value corresponds to a second hash value.

4. The method of claim 3 further comprising:

responsive to an absence of the selected cookie, processing the request with the current policy.

5. The method of claim 3, wherein the selected cookie includes a universal resource identifier, a user identification, and a user group identification.

6. A data processing system for processing a request, the data processing system comprising:

receiving means for receiving the request;

comparing means, responsive to a first hash value being present within the request, for comparing the first hash value to a second hash value, wherein the second hash value represents a current policy configuration for a quality of service; and setting means, responsive to a match between the first hash value and the second hash value, for setting a quality of service based on information associated with the first hash value;

first identifying means, responsive to an absence of a hash value in the request, for identifying a policy rule for processing the request to form an identified policy rule;

second identifying means for identifying a classification for the request using the identified policy rule;

hashing means for hashing the current policy configuration, of which the identified policy rule is a part, using a hashing algorithm to generate a current hash value; and placing means for placing the current hash value and the information into the request.

7. The data processing system of claim 6, wherein the hash value and the information are placed into a cookie.

8. A data processing system for processing a request, the data processing system comprising:

first determining means, responsive to receiving a request containing a selected cookie in which the selected cookie includes a first hash value and information associated with the hash value, for determining whether the first hash value corresponds to a second hash value, wherein the second hash value represents a current policy configuration for processing reguests by the data processing system;

processing means, responsive to a correspondence between the first hash value and the second hash value, for processing the request using the information;

second determining means, responsive to receiving a request containing the selected cookie, for determining whether the selected cookie is stale;

generating means, responsive to a determination that the selected cookie is not stale, for generating a new classification for the request; and preventing means, responsive to a determination that the selected cookie is stale, for preventing initiation of the first determining means.

9. The data processing system of claim 8, wherein the processing means is a first processing means and hater comprising:

second processing means, responsive to an absence of the selected cookie, for processing the request with the current policy configuration to generate a first classification for the request;

applying means for applying a hashing algorithm to the current policy configuration to generate the first hash value; and placing means for placing the first hash value and information associated with the first hash value within a new cookie.

10. The data processing system of claim 8, wherein the selected cookie includes a universal resource identifier, a user identification, and a group identification.

11. A computer program product in a computer readable medium for processing a request, the computer program product comprising:

first instructions for receiving the request;

second instructions, responsive to a first hash value being present within the request, for comparing the first hash value to a second hash value, wherein the second hash value represents a current policy configuration for a quality of service;

third instructions, responsive to a match between the first hash value and the second hash value, for setting a quality of service based on information associated with the first hash value, fourth instructions, responsive to an absence of a hash value in the request, for identifying a policy rule for processing the request to form an identified policy rule;

fifth instructions for identifying a classification for the request using the identified policy rule;

sixth instructions for hashing the current policy configuration, of which the identified policy rule is a part, using a hashing algorithm to generate a current hash value; and seventh instructions for placing the current hash value and the information into the request.

12. A computer program product in a computer readable medium for processing a request, the computer program product comprising:
- first instructions, responsive to receiving a request containing a selected cookie in which the selected cookie includes a first hash value and information associated with the hash value, for determining whether the first hash value corresponds to a second hash value, wherein the second hash value represents a current policy configuration for processing reguests by the data processing system;
- second instructions, responsive to a correspondence between the first hash value and the second hash value, for processing the request using the information;
- third instructions, responsive to receiving a request containing the selected cookie, for determining whether the selected cookie is stale;
- fourth instructions, responsive to a determination that the cookie is not stale, for generating a new classification for the request; and
- fifth instructions, responsive to a determination that the selected cookie is stale, for preventing initiation of the first determining step.

13. The computer program product of claim 11, wherein the hash value and the information arc placed in a cookie.

14. The computer program product of claim 12 further comprising:
- sixth instructions, responsive to en absence of the selected cookie, for processing the request with the current policy configuration to generate a first classiacation for the request;
- seventh instructions for applying a bashing algorithm to the current policy configuration to generate the first hash value; and
- eighth instructions for placing the first hash value and information associated with the first hash value within a new cookie.

15. The computer program product of claim 12, wherein the selected cookie includes a universal resource identifier, a user identification, and a group identification. configuration to generate a first classification for the request;
- applying a hashing algorithm to the current policy configuration to generate the first hash value; and
- placing the first bash value and information associated with the first hash value within a new cookie.

* * * * *